United States Patent
Houser et al.

(10) Patent No.: US 12,548,697 B2
(45) Date of Patent: Feb. 10, 2026

(54) APPARATUS FOR REMOVING FOIL SHIELD FROM CABLE

(71) Applicant: TE Connectivity Solutions GmbH, Schaffhausen (CH)

(72) Inventors: Matthew Steven Houser, Middletown, PA (US); Joseph Stachura, Middletown, PA (US); Mark Andrew Ondo, Middletown, PA (US); Matthew Orlowski, Middletown, PA (US); Amgad Ghaly, Middletown, PA (US); Alexandra Spitler, Middletown, PA (US)

(73) Assignee: TE Connectivity Solutions GmbH (CH)

( * ) Notice: Subject to any disclaimer, the term of this patent is extended or adjusted under 35 U.S.C. 154(b) by 315 days.

(21) Appl. No.: 18/330,732

(22) Filed: Jun. 7, 2023

(65) Prior Publication Data
US 2023/0317321 A1   Oct. 5, 2023

Related U.S. Application Data

(60) Division of application No. 17/394,871, filed on Aug. 5, 2021, now Pat. No. 11,710,585, which is a continuation-in-part of application No. 16/359,323, filed on Mar. 20, 2019, now Pat. No. 11,159,003.

(51) Int. Cl.
*H01B 13/22*   (2006.01)
*H01B 13/00*   (2006.01)

(52) U.S. Cl.
CPC ....... *H01B 13/228* (2013.01); *H01B 13/0016* (2013.01)

(58) Field of Classification Search
CPC .............. H01B 13/228; H01B 13/0016; H02G 1/1282; G02B 6/245; Y10T 29/49194; B23K 26/38
See application file for complete search history.

(56) References Cited

U.S. PATENT DOCUMENTS

| | | | | |
|---|---|---|---|---|
| 4,745,828 A | * | 5/1988 | Stepan | G02B 6/245 81/9.42 |
| 5,142,121 A | * | 8/1992 | Ezaki | H02G 1/1256 219/121.85 |
| 10,476,245 B2 | * | 11/2019 | Ben-Ron | B23K 26/38 |
| 2020/0303909 A1 | | 9/2020 | Houser et al. | |

FOREIGN PATENT DOCUMENTS

| | | |
|---|---|---|
| EP | 3444911 A1 | 2/2019 |
| WO | 2020165086 A1 | 8/2020 |

* cited by examiner

*Primary Examiner* — Donghai D Nguyen (57) ABSTRACT

A system for removing a foil shield from a cable comprises an induction coil for inductively heating the foil shield of the cable, a cable feeding device for selectively passing the cable through the induction coil, a cutting blade for selectively removing at least a portion of the cable, and a sensor for detecting at least one characteristic of the cable.

19 Claims, 12 Drawing Sheets

APPARATUS FOR REMOVING FOIL SHIELD FROM CABLE

CROSS-REFERENCE TO RELATED APPLICATIONS

This application is a divisional of U.S. patent application Ser. No. 17/394,871, filed Aug. 5, 2021, which is a continuation-in-part of U.S. patent application Ser. No. 16/359,323, now issued U.S. Pat. No. 11,159,003, filed Mar. 20, 2019, the entire disclosures of which are incorporated herein by reference.

FIELD OF THE INVENTION

The present invention is directed to a system performing a process or method to weaken the foil shield on shielded cable using heating. In particular, the present invention is directed to a process or method to weaken the foil shield on shielded cable using induction heating.

BACKGROUND OF THE INVENTION

Certain cable types, such as those used for electric and hybrid vehicles, have a foil shield that must be removed to prepare the cable for termination. The foil consists of a Poly-Ethylene Terephthalate (PET) plastic substrate with aluminum deposited on the bottom. The foil is typically very difficult to remove because it is very thin (0.03 mm thick) and tear-resistant (due to the PET substrate). In addition, the braid shield, which is directly beneath the foil, must not be damaged when the foil is removed.

Current foil removal methods include manual processes, blade processes, and laser processes. Manual processes are slow and costly. Blade processes are typically very expensive and often damage the braid shield. Laser processes are expensive as costly equipment is required.

It would, therefore, be beneficial to provide a cost effective and efficient process or method to remove the foil without damaging the braid shield or the other components of the cable. In addition, it would be advantageous to provide a system or method of removing the foil which can be uses as a stand-alone process or method or as an integrated method in a machine which performs other functions on the cable.

SUMMARY OF THE INVENTION

The invention is directed to a process or method that uses heating, such as, but not limited to, induction heating, to weaken the foil in the area where it will be removed. The heating generates heat in the aluminum component of the foil, which heats the Poly-Ethylene Terephthalate (PET) plastic component of the foil and either melts it or vaporizes it. The foil can be heated either through the outer insulation, or the outer insulation can be pre-cut to allow the vaporized PET to escape. When the PET plastic melts beneath the outer insulation, it sticks to the outer insulation as it cools. This allows for the foil and outer insulation to be removed in one step.

An embodiment is directed to a method of removing a foil shield from a cable, the method comprising: positioning the cable proximate an induction heating source; heating the foil shield in a designated area to weaken the foil shield; and removing an outer insulation of the cable and the foil shield after the foil shield has been heated.

An embodiment is directed to a method of removing a foil shield from a cable, the method comprising: positioning the cable proximate an induction heating source; heating the foil shield by induction heating in a designated area to weaken the foil shield; removing the induction heating source; cutting an outer insulation of the cable in the designated area; and removing the outer insulation of the cable and the foil shield from the designated area.

An embodiment is directed to a method of removing a foil shield from a cable, the method comprising: positioning the cable proximate an induction heating source; exposing a portion of the foil shield in the designated area by cutting the outer insulation; heating the foil shield by induction heating in a designated area to weaken the foil shield; removing the induction heating source; and removing the outer insulation of the cable and the foil shield from the designated area.

An embodiment is directed to a system for removing a foil shield from a cable comprising an induction coil for inductively heating the foil shield of the cable, a cable feeding device for selectively passing the cable through the induction coil, a cutting blade for selectively removing at least a portion of the cable, and a sensor for detecting at least one characteristic of the cable.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Moreover, the features and benefits of the invention are illustrated by reference to the preferred embodiments. Accordingly, the invention expressly should not be limited to such embodiments illustrating some possible non-limiting combination of features that may exist alone or in other combinations of features, the scope of the invention being defined by the claims appended hereto.

Figure 1:
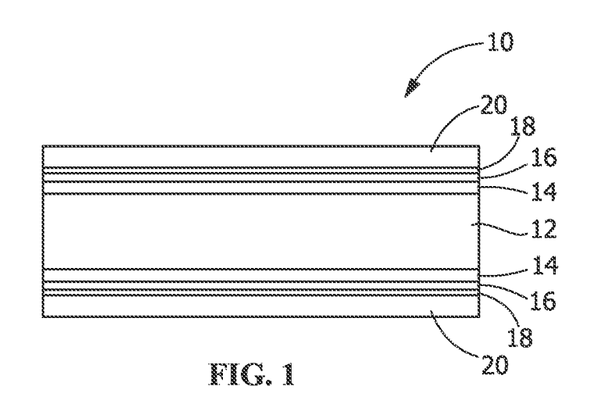
FIG. 1 is a longitudinal cross-section of an illustrative high voltage cable which has a foil shield provided therein.
Figure 2:
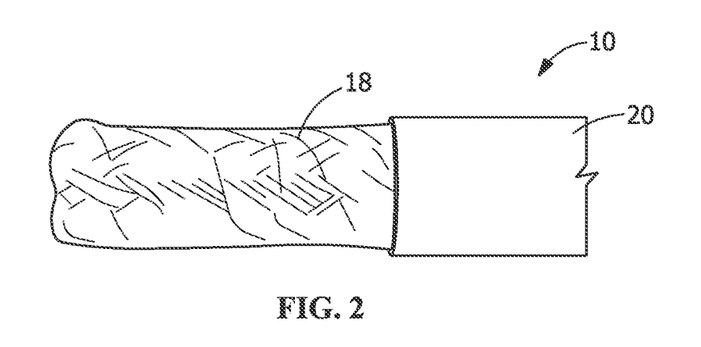
FIG. 2 is a perspective view of the cable with a portion of the outer insulation removed to show the foil shield.

Referring to FIGS. 1 and 2, an illustrative embodiment of an electrical cable 10 is shown. In the embodiment shown, the cable 10 is a high voltage cable, but other cables can be used. The cable 10 includes a conductor 12 which conducts the electrical current. Inner insulation 14 extends circumferentially around the conductor 12. A braid shield 16 extends circumferentially around the inner insulation 14. A foil shield 18 extends circumferentially around the braid shield 16. Outer insulation 20 extends circumferentially around the foil shield 18. In the illustrative embodiment shown, the foil shield 18 has an aluminum component and a Poly-Ethylene Terephthalate (PET) plastic component, however, other components may be used.

In order to terminate the cable 10 as required for particular applications, the foil shield 18 must be removed to allow for termination of the conductor 12 of the cable 10. However, the foil shield 18 is typically very difficult to remove because it is very thin (for example, 0.03 mm thick) and tear-resistant. In addition, the braid shield 16, which is directly beneath the foil shield 18, must not be damaged when the foil shied 18 is removed. The method as described and claimed herein allows the foil shield 18 to be efficiently and cost effectively removed without damaging the braid shield 16 or other components of the cable 10.

Figure 3:
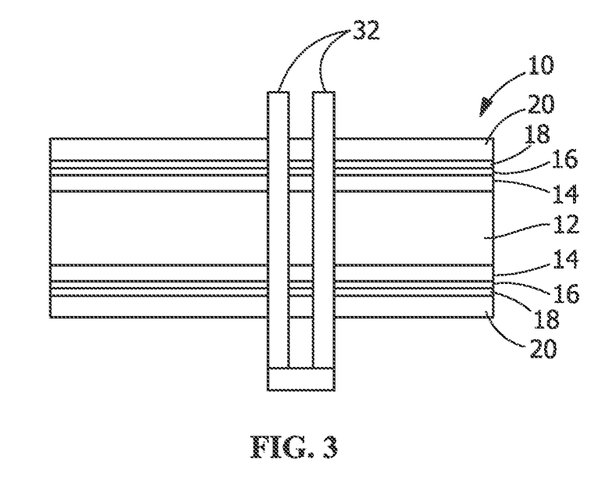
FIG. 3 is a diagrammatic view of the longitudinal cross-section of the illustrative cable with an induction coil extending around the circumference of a section of the cable.
Figure 4:
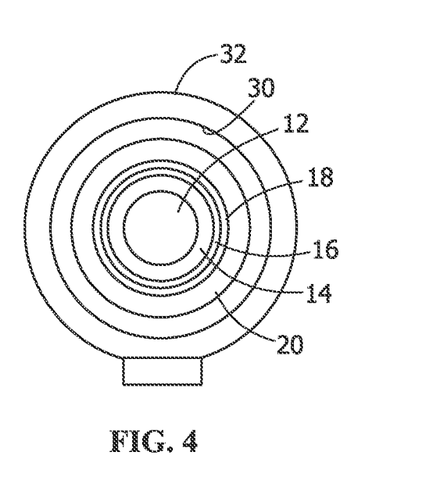
FIG. 4 is a diagrammatic end view of the illustrative cable with the induction coil extending around the circumference of a section of the cable, as shown in FIG. 3.

Referring to FIGS. 3 through 9, the cable 10 is positioned in an opening 30 of an induction coil 32, as shown in FIGS. 3 and 4. Alternatively, the opening 30 of the induction coil 32 is positioned over the cable 10. The induction coil 32 is positioned over an area 34 of the cable 10 in which the foil shield 18 and the outer conductor 20 are to be removed or stripped from the cable 10 to expose the braid shield 16. The opening 30 of the induction coil 32 is dimensioned to fit over the outer insulation 20 without engaging the outer insulation 20.

Figure 5:
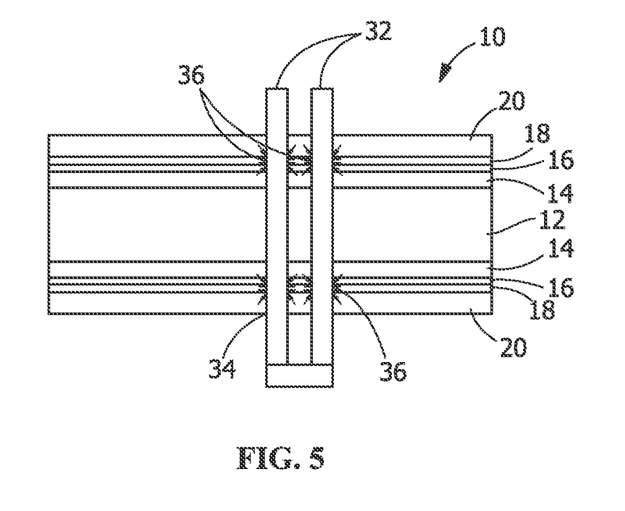
FIG. 5 is a diagrammatic view of the longitudinal cross-section of the illustrative cable with the induction coil extending around the circumference of a section of the cable, the induction coil applying heat to the cable.
Figure 6:
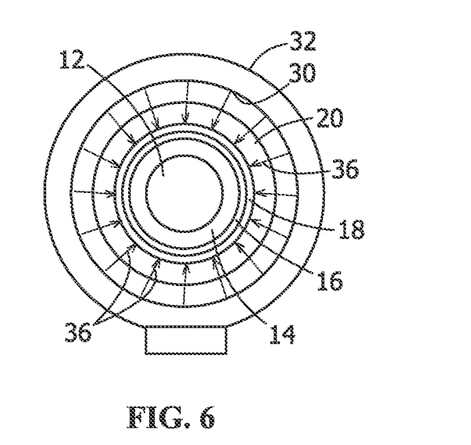
FIG. 6 is a diagrammatic end view of the illustrative cable with the induction coil extending around the circumference of a section of the cable, the induction coil applying heat to the cable, as shown in FIG. 5.

With the induction coil 32 properly positioned, the induction coil 32 is powered, causing the induction coil to generate a rapidly alternating magnetic field which causes heat to be generated in the foil shield 18, as represented by 36 in FIGS. 5 and 6. In the embodiment shown in FIGS. 5 and 6, the foil shield 18 is heated through the outer insulation 20. The induction heating generates heat in the aluminum component of the foil shield 18 in the designated or affected area 34, which heats the plastic component of the foil shield 18 in the designated or affected area above a melting point of the plastic component. As the plastic component is melted, the plastic component pools together and forms voids in which only the aluminum component remains. As the aluminum component is thin and has little shear or tensile strength, the pooling of the plastic component and the forming of voids weakens the foil shield 18 in the designated or affected area 34.

The power is supplied to the induction coil 32 for a specified amount of time based on the application. The frequency of the induction coil 32 may be varied to control the depth of heating or skin depth, for example, higher frequency allows the depth of the induction heating to be controlled such that the penetration of the induction heating is shallow, whereby the induction heating does not penetrate into the braid shield 16 or the conductor 12. Whereas, a lower frequency allows induction heating to more deeply penetrate into the braid shield 16 or the conductor 12.

Figure 7:
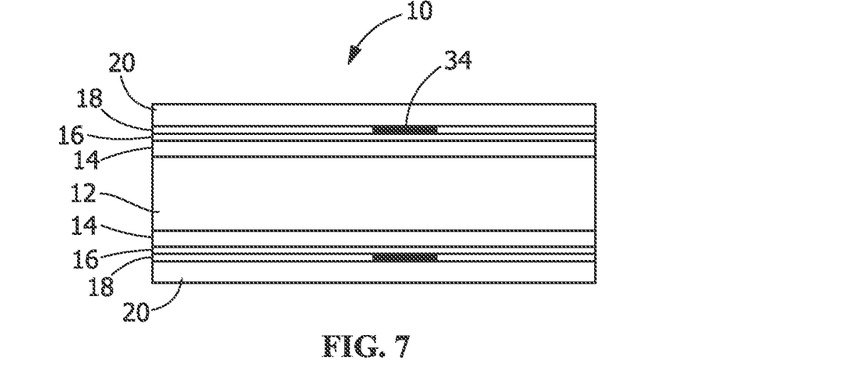
FIG. 7 is a diagrammatic view of the longitudinal cross-section of the illustrative cable illustrating the heat effected area of the cable.

As represented in FIG. 7, after the specified time, the heat generated by the induction coil 32 is stopped and the induction coil 32 is removed from proximate the designated or affected area 34 of the cable 10. With the heat removed, the melted pooled plastic component is allowed to cool. As the plastic component is cooled, the plastic component and the foil shield 18 in the designated or affected area 34 sticks or adheres to the outer insulation 20. This allows for the foil shield 18 and outer insulation 20 to act as one piece in the designated or affected area 34.

Figure 8:
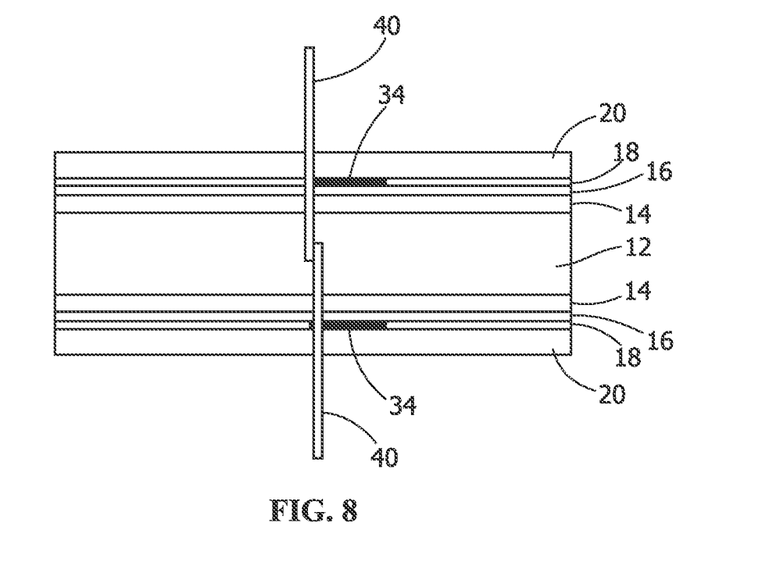
FIG. 8 is a diagrammatic view of the longitudinal cross-section of the illustrative cable illustrating stripping blades in engagement with the outer insulation of the cable.

As best shown in FIG. 8, the stripping blades 40 are then moved into engagement with the outer insulation 20 at one end of the designated or affected area 34 of the cable 10. Alternatively, the designated or affected area 34 of the cable 10 is moved into position relative to the stripping blades 40. As this occurs, the sharp edges of the stripping blades 40 pierce or cut the outer insulation 20. The depth of the stripping blades 40 is controlled to ensure that the stripping blades 40 do not contact the braid shield 16. In various embodiments, the stripping blades 40 may contact the foil shield 18, while in other embodiments, the stripping blades 40 may not contact the foil shield 18.

Figure 9:
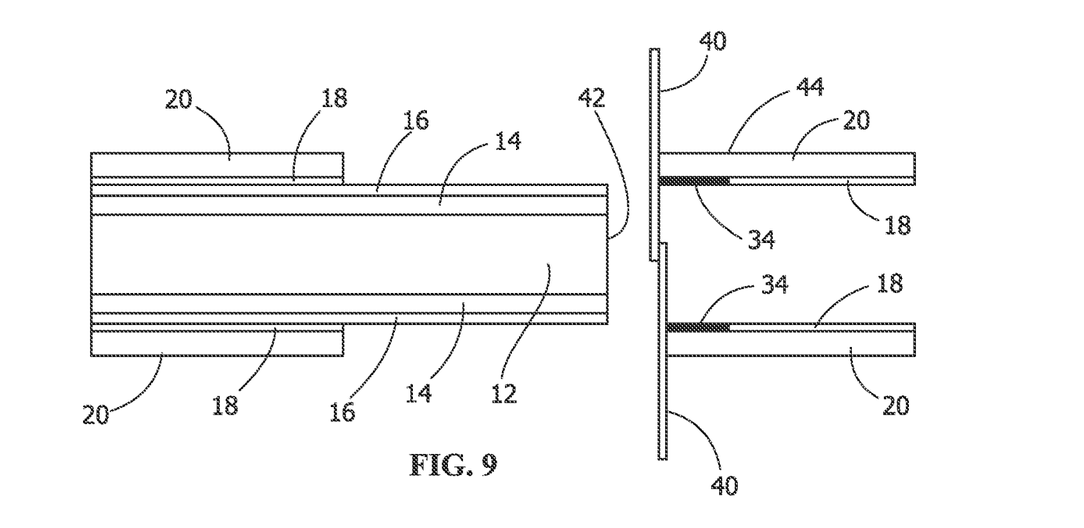
FIG. 9 is a diagrammatic view of the longitudinal cross-section of the illustrative cable illustrating the stripping blades removing the outer insulation and the foil shield of the cable.

With the stripping blades 40 properly positioned relative to the outer insulation 20, the stripping blades 40 are moved in an axial direction relative to the cable 10 toward a free end 42 of the cable 10, as represented in FIG. 9. As the stripping blades 40 are in engagement with the outer insulation 20, the movement of the stripping blades 40 in the axial direction causes the cut portion 44 of the outer insulation 20 to be moved axially relative to the cable 10 simultaneously with the stripping blades 40.

As the foil shield 18 is adhered to the outer insulation 20 in the designated or affected area 34, the movement of the outer insulation 20 in the cut portion 44 causes the foil shield 18 in the cut portion 44 to be moved axially relative to the cable 10 simultaneously with the stripping blades 40. As this occurs, the weakened foil shield 18 in the designated or affected area 34 tears and is released from the foil shield 18 in the non-cut portion 46 of the cable 10.

Referring to FIGS. 10 through 16, an alternate illustrative method or process of removing the foil shield 18 from the cable 10 is shown. In this illustrative embodiment the stripping blades 40 are moved into position relative to designated or affected area 34 proximate the free end 42 of the cable 10. Alternatively, the designated or affected area 34 of the cable 10 is moved into position relative to the stripping blades 40.

Figure 10:
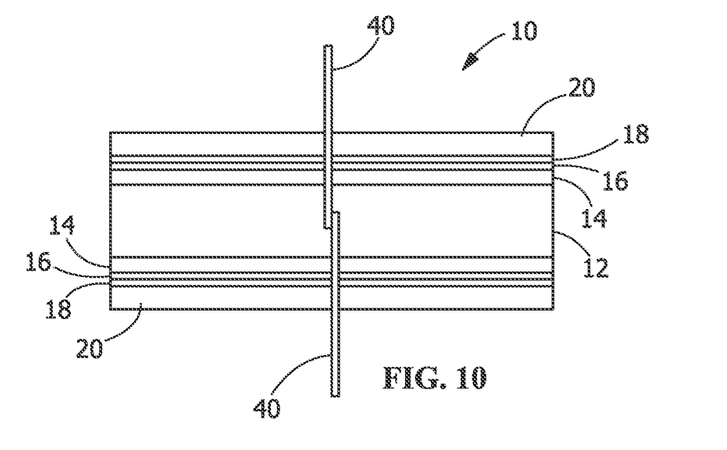
FIG. 10 is a diagrammatic view of the longitudinal cross-section of the illustrative cable illustrating an alternate step in which the stripping blades are in engagement with the outer insulation of the cable prior to the induction coil applying heat to the cable.

The stripping blades 40 are moved into engagement with the outer insulation 20, as shown in FIG. 10. As this occurs, the sharp edges of the stripping blades 40 pierce or cut the outer insulation 20. The depth of the stripping blades 40 is controlled to ensure that the stripping blades 40 do not contact the foil shield 18 or the braid shield 16.

Figure 11:
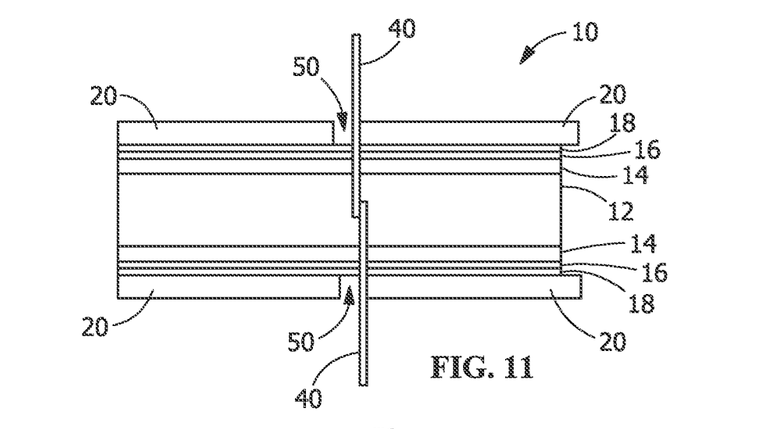
FIG. 11 is a diagrammatic view of the longitudinal cross-section of the illustrative cable of FIG. 10 illustrating the stripping blades partially removing the outer insulation and exposing a portion of the foil shield of the cable.

With the stripping blades 40 properly positioned relative to the outer insulation 20, the stripping blades 40 are moved a controlled distance in an axial direction relative to the cable 10 toward a free end 42 of the cable 10 to form an opening or split 50 in the outer insulation 20 of the cable 10, as represented in FIG. 11, thereby exposing a portion of the foil shield 18 in the designated or affected area 34 through the opening 50.

Figure 12:
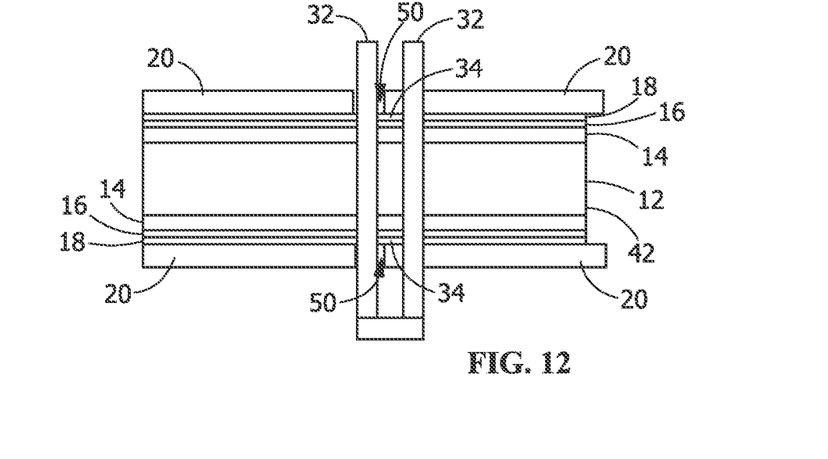
FIG. 12 is a diagrammatic view of the longitudinal cross-section of the illustrative cable with an induction coil extending around the circumference of a section of the cable of FIG. 10.

With a portion of the foil shield 18 in the designated or affected area 34 exposed, the stripping blades 40 are retracted and the cable 10 is positioned in an opening 30 of an induction coil 32, as shown in FIG. 12. Alternatively, the opening 30 of the induction coil 32 is positioned over the cable 10. The induction coil 32 is positioned over an area 34 of the cable 10 in which the foil shield 18 and the outer conductor 20 are to be removed or stripped from the cable 10 to expose the braid shield 16. The opening 30 of the induction coil 32 is dimensioned to fit over the outer insulation 20 without engaging the outer insulation 20.

Figure 13:
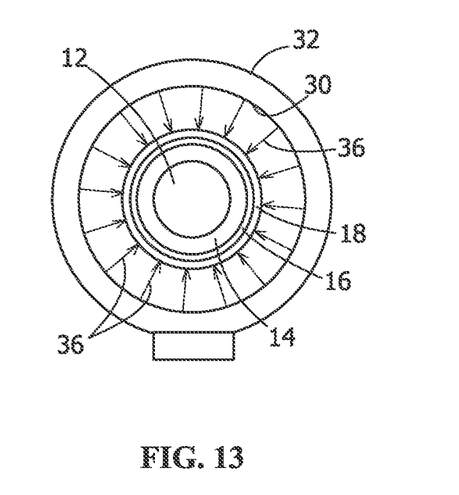
FIG. 13 is a diagrammatic end view of the illustrative cable with the induction coil extending around the circumference of a section of the cable, the induction coil applying heat to the cable.

With the induction coil 32 properly positioned, the induction coil 32 is powered, causing the induction coil to generate a rapidly alternating magnetic field which causes heat to be generated in the foil shield 18, as represented by 36 in FIG. 13. In the embodiment shown in FIG. 13, the foil shield 18 is heated through the opening 50. The induction heating generates heat in the aluminum component 51 of the foil shield 18 in the designated or affected area 34, which heats the plastic component of the foil shield 18 in the designated or affected area above a melting point of the plastic component. As the plastic component is melted, the plastic component exposed in the opening 50 is vaporized and escapes, while the plastic component proximate the opening 50 beneath the outer insulation 20 melts. As only the aluminum 51 component remains in the portion of the designated or affected area 34 which is exposed to the opening 50, the aluminum component 51 is thin and has little shear or tensile strength, causing the foil shield 18 to be weak in the designated or affected area 34 which is exposed to the opening 50.

The power is supplied to the induction coil 32 for a specified amount of time based on the application. The frequency of the induction coil 32 may be varied to control the depth of heating or skin depth. For example, a higher frequency allows the depth of the induction heating to be controlled such that the penetration of the induction heating is shallow, whereby the induction heating does not penetrate into the braid shield 16 or the conductor 12. Whereas, a lower frequency allows induction heating to more deeply penetrate into the braid shield 16 or the conductor 12.

Figure 14:
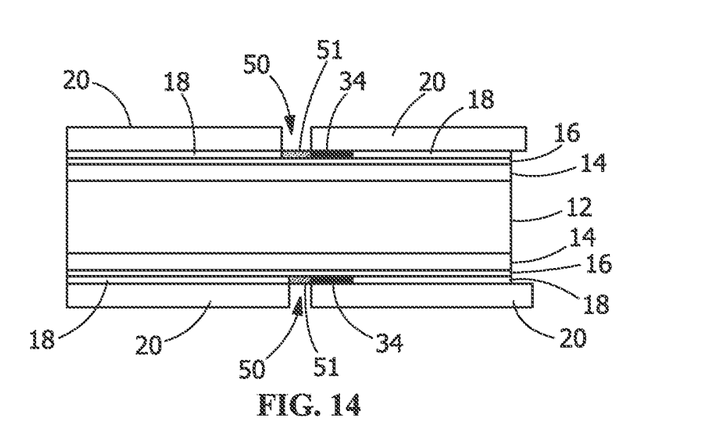
FIG. 14 is a diagrammatic view of the longitudinal cross-section of the illustrative cable of FIG. 13, illustrating the heat effected area of the cable.

As represented in FIG. 14, after the specified time, the heat generated by the induction coil 32 is stopped and the induction coil 32 is removed from proximate the designated or affected area 34 of the cable 10. With the heat removed, the melted plastic component below the outer insulation 20 is allowed to cool. As the plastic component is cooled, the plastic component and the foil shield 18 in the designated or affected area 34 beneath the outer insulation 20 sticks or adheres to the outer insulation 20. This allows for the foil shield 18 and outer insulation 20 to act as one piece in the designated or affected area 34.

Figure 15:
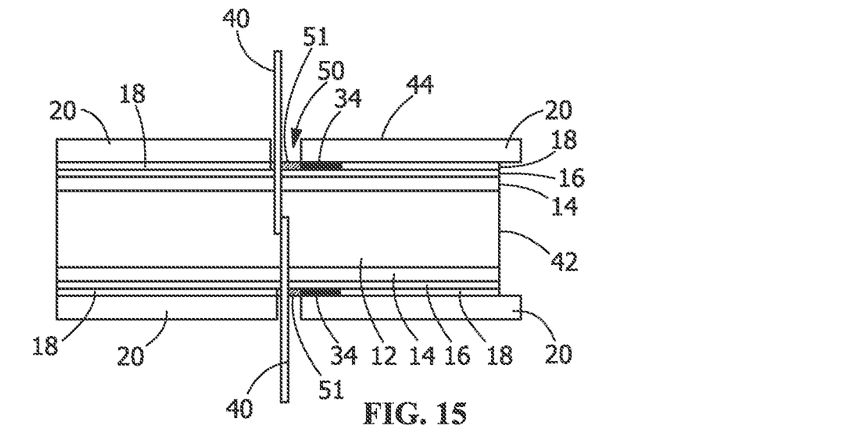
FIG. 15 is a diagrammatic view of the longitudinal cross-section of the illustrative cable of FIG. 14, illustrating stripping blades in engagement with the outer insulation of the cable.

As best shown in FIG. 15, the stripping blades 40 are again moved into engagement with the outer insulation 20 at one end of the designated or affected area 34 of the cable 10. Alternatively, the designated or affected area 34 of the cable 10 is moved into position relative to the stripping blades 40. As this occurs, the sharp edges of the stripping blades 40 pierce or cut the outer insulation 20. The depth of the stripping blades 40 is controlled to ensure that the stripping blades 40 do not contact the braid shield 16. In various embodiments, the stripping blades 40 may contact the foil shield 18, while in other embodiments, the stripping blades 40 may not contact the foil shield 18.

Figure 16:
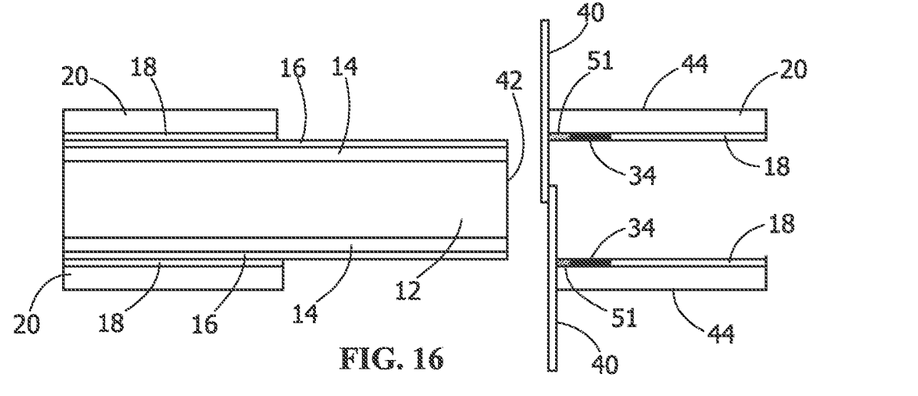
FIG. 16 is a diagrammatic view of the longitudinal cross-section of the illustrative cable of FIG. 15, illustrating the stripping blades removing the outer insulation and the foil shield of the cable.

With the stripping blades 40 properly positioned relative to the outer insulation 20, the stripping blades 40 are moved in an axial direction relative to the cable 10 toward a free end 42 of the cable 10, as represented in FIG. 16. As the stripping blades 40 are in engagement with the outer insulation 20, the movement of the stripping blades 40 in the axial direction causes the cut portion 44 of the outer insulation 20 to be moved axially relative to the cable 10 simultaneously with the stripping blades 40.

As the foil shield 18 is adhered to the outer insulation 20 in the designated or affected area 34, the movement of the outer insulation 20 in the cut portion 44 causes the foil shield 18 in the cut portion 44 to be moved axially relative to the cable 10 simultaneously with the stripping blades 40. As this occurs, the weakened foil shield 18 in the designated or affected area 34 tears and is released from the foil shield 18 in the non-cut portion 46 of the cable 10.

Figure 17:
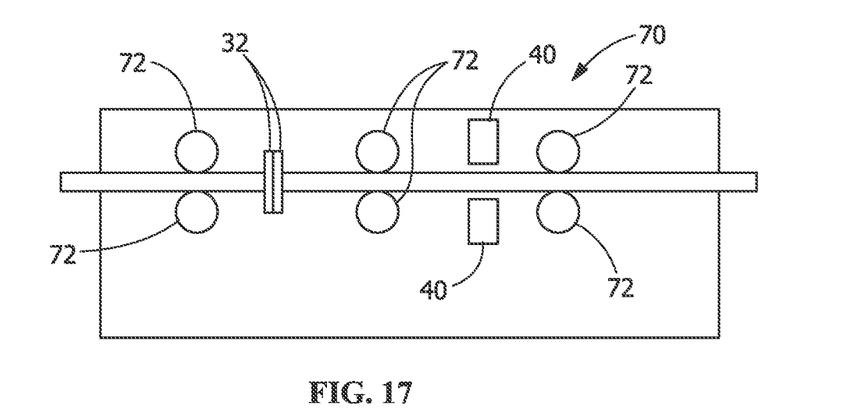
FIG. 17 is a diagrammatic view illustrating the induction coil integrated into a machine that performs other functions of the cable.

The method described with respect to the embodiment shown in FIGS. 1 through 16 may be integrated in a machine 70 which performs other functions on the cable 10, as shown in FIG. 17. The machine 70 may include, but is not limited to the induction coil 32, feed wheels 72 and cutting blades 40. Representative machines 70 include, but are not limited to, cut-to-length machines, cut-and-strip machines or lead makers. The cable 10 may feed from a spool (not shown). The machine 70 will pause feeding the cable 10 in specified areas where the induction coil 32 operates and where the outer jacket 20 and foil shield 18 is stripped.

The invention is directed to a process or method that uses induction heating to weaken the foil in the area where it will be removed. The induction heating generates heat in the aluminum component of the foil, which heats the plastic component of the foil and either melts it or vaporizes it. The foil can be heated either through the outer insulation, or the outer insulation can be pre-cut to allow the vaporized plastic component to escape. When the plastic component melts beneath the outer insulation, it sticks to the outer insulation as it cools. This allows for the foil and outer insulation to be removed in one step. The method allows different materials or components and different cable sizes, configurations and diameters to be accommodated by changing variables including power, frequency, heat applied time, and coil geometry. The method also allows for different heating elements and heating processes and is not limited to induction coils and induction heating.

Methods according to embodiments of the present invention may be carried out wholly or in part by one or more automated control systems implementing and/or controlling the above-described components, as well as additional hardware and software features. For example, referring generally to FIG. 18, an exemplary control system 100 useful for performing the operations of the embodiments of the present disclosure is shown. The control system 100 may be under fully-automated control, or fully or partially controlled via one or more user input devices 105 (e.g., touch screen/buttons/keyboards, etc.). The control system 100 includes at least one processor 110, such as a digital microprocessor responsive to instructions stored on a memory device 120 for performing the methods or operations described herein. The processor 110 is operatively coupled to the induction coil 32, and/or to a power supply thereof for selectively powering the coil under voltage and/or current control. The system 100 may further include a current and/or frequency monitor or sensor 130, which may be operative with the processor 110 to monitor and/or control the frequency and current in or through the induction coil 32.

Figure 18:
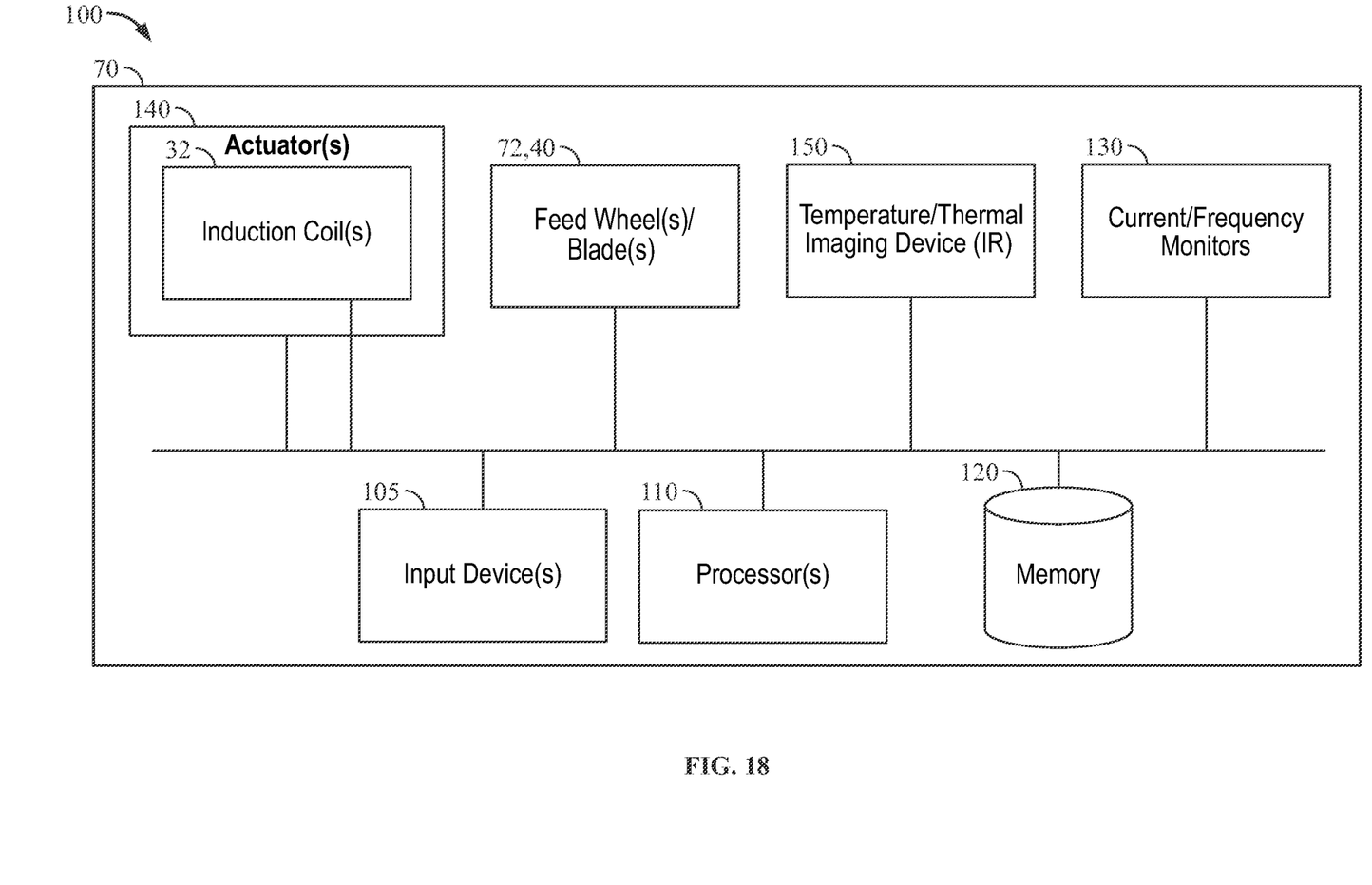
FIG. 18 is a simplified view of a system used to control the machine of FIG. 17 for performing methods according to embodiments of the present disclosure.

The system 100, and more specifically the processor 110, may control the operation of the feed wheels 72 of the machine 70 for selectively feeding the cable through the machine. Likewise, the system 100 may comprise one or more actuators 140 (e.g., a linear actuator) operatively attached to the induction coil 32 for selectively moving the coil relative to a cable. In one embodiment, the one or more actuators 140 may be multi-directional, having the ability to vary not only the longitudinal position of the induction coil 32 along a length of a cable, but also the radial or lateral distance between the cable and the induction coil, further promoting the ability to accurately control the generation of heat in predetermined areas of the cable.

The system 100 further comprises a temperature sensing device and/or imaging device, such as a thermal imaging device, and more specifically an infrared (IR) temperature sensor and/or camera 150, by way of example only. In other embodiments, the system 100 may comprise separate temperature sensing devices and imaging devices. Further, the imaging device 150 may be optical, such as a digital camera or video capturing device without departing from the scope of the present disclosure. The thermal imaging device 150 may be mounted to the induction coil 32, or to another portion of the system 70 suitable for achieving desired operation.

The system 100, including the processor 110 operative with associated instructions pre-stored on the memory device 120 enables several additional modes of operations to those described above with respect to the proceeding figures. By way of example, using the current and/or frequency monitor 130, as well as predetermined values stored on the memory device 120, the processor 110 is operative to determine or estimate a characteristic, such as a size of the cable under heating, and automatically adjust various operating parameters according to this determination. The system 100 may vary heating times, periodic cycling parameters, frequency, voltage and/or current associated with the operation of the induction coil 32 according to a detected cable size for achieving optimal operation. These parameters may be pre-stored in the memory device 120 such that, upon a determination by the processor 110 as to the relevant characteristics of the cable 10, the function of the coil 32 may be automatically controlled without the need for further user input.

Figure 19:
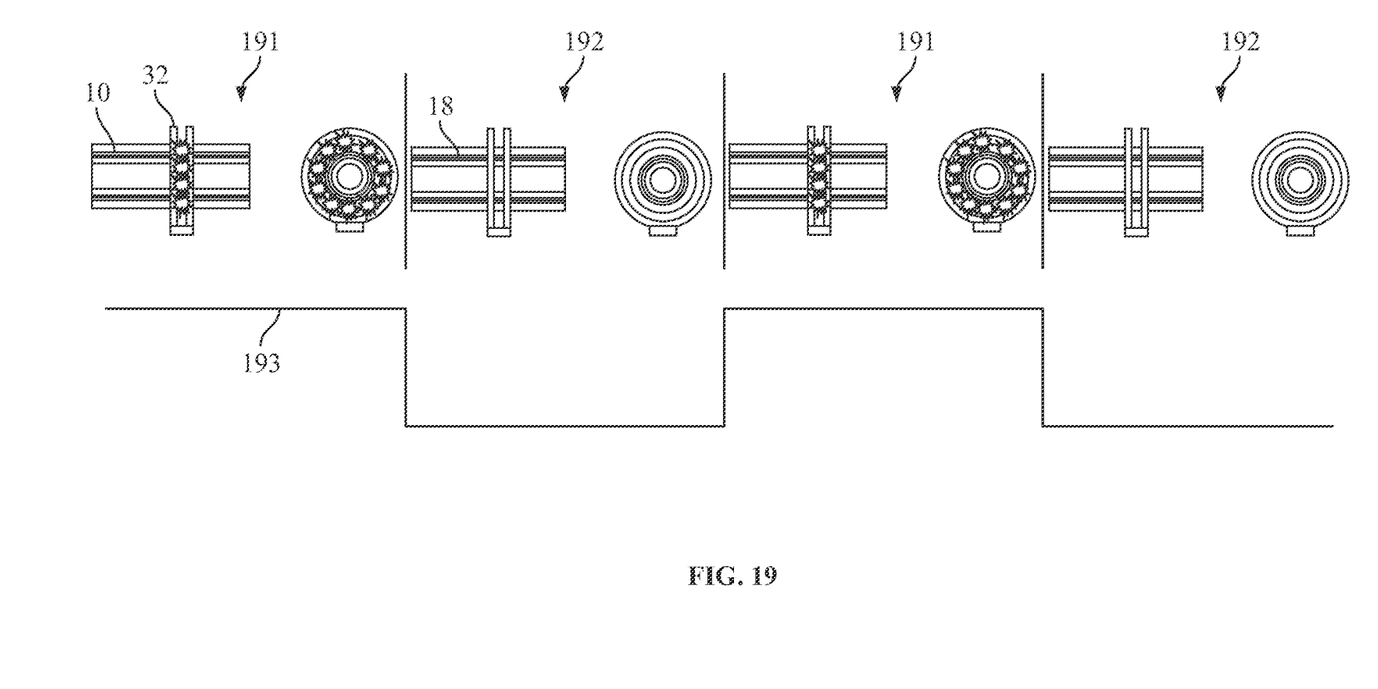
FIG. 19 is a diagrammatic view of the longitudinal cross-section of the illustrative cable with the induction coil applying heat to the cable in a periodic manner.

Referring generally to FIG. 19, operating the induction coil 32 under precise computer control enables the implementation of thermal cycling operations, including a plurality of powered or heating cycles 191 of the induction coil 32, each followed by a subsequent depowered or cooling period 192 of the induction coil. This on/off cycling is beneficial to accurately generate a predetermined amount of heat in the cable 10, for example, in the foil shield 18. An exemplary thermal cycle, represented in the figure by a square wave function 193, may include powering the induction coil 32 for 0.5 seconds, and de-powering for 0.5 seconds. This may be performed for a predetermined plurality of cycles, for example four cycles, to achieve desired heating characteristics (e.g., temperature and uniformity) of the cable 10.

Figure 20A:
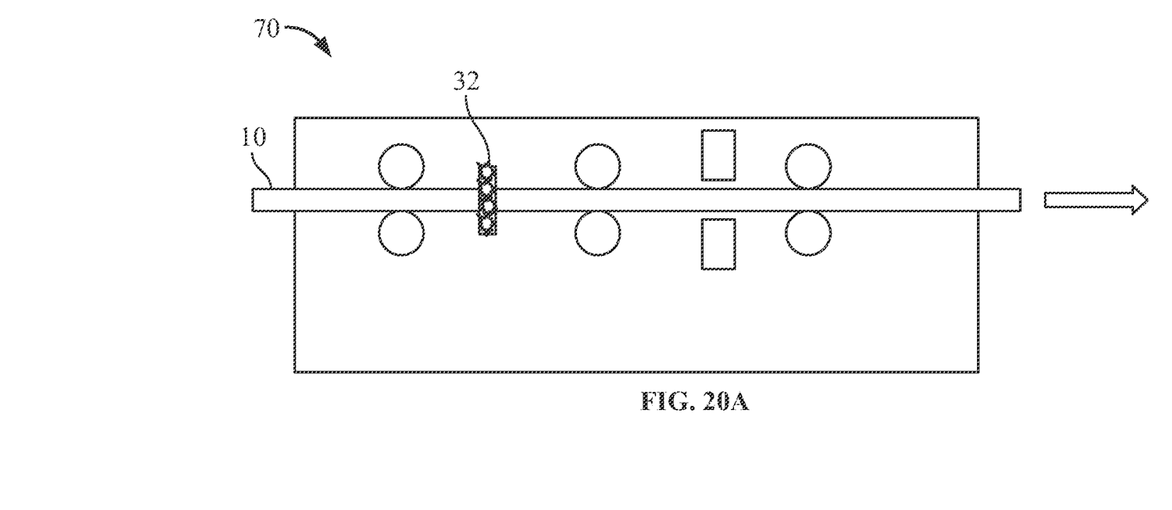
FIGS. 20A, 20B and 20C are diagrammatic views of a longitudinal cross-section of the illustrative cable being fed through the induction coil so as to apply heat over a longer area of the cable.
Figure 20B:
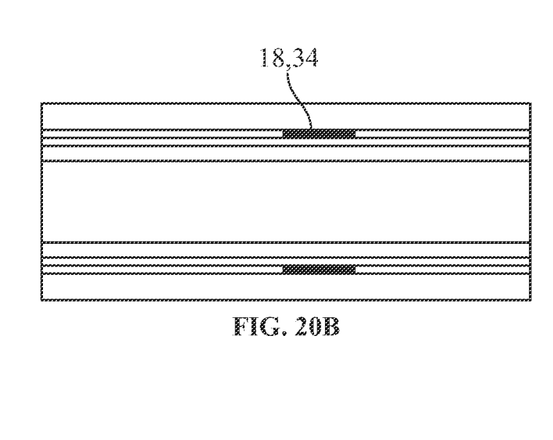
Figure 20C:
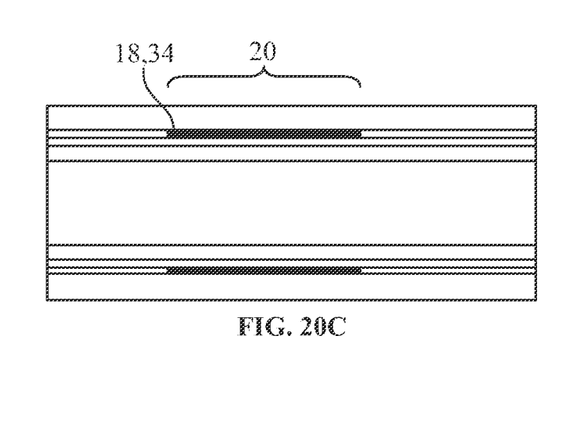

With reference to FIGS. 20A, 20B and 20C, the machine 70, alone or in combination with the one or more actuators 140 associated with the induction coil 32, is operative to move the cable 10 longitudinally through the coil in the indicated direction while heating the foil shield 18 along an elongated zone. More specifically, FIG. 20B may represent the designated or affected area 34 of a stationary induction coil 32 and cable 10, while FIG. 20C is indicative of a process wherein the cable 10 is translated during heating, increasing a length of the designated or affected area 34. It has been determined that the outer insulation 20 of the cable 10 is often easier to remove by selectively adhering the foil shield 18 in a specific area of the cable, thereby increasing its rigidity and thus decreasing its resistance to tearing, breaking or cutting. Thus, by feeding the cable 10 and/or translating the induction coil 32 to a desired location, selective removal of the outer insulation 20 and/or foil shield 18 is further enabled. This application is specifically useful for magnetic wire applications, wherein very thin insulation layers or coatings more easily selectively removed via the above-described process.

Figure 21A:
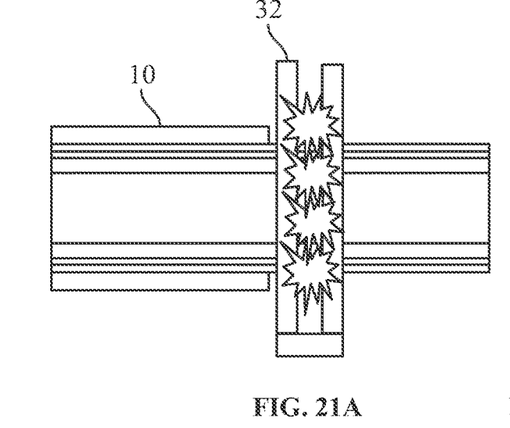
FIGS. 21A and 21B are diagrammatic views of the longitudinal cross-section of the illustrative cable with the induction coil extending around a circumference of the cable at a targeted location in which the insulation has previously been removed.
Figure 21B:
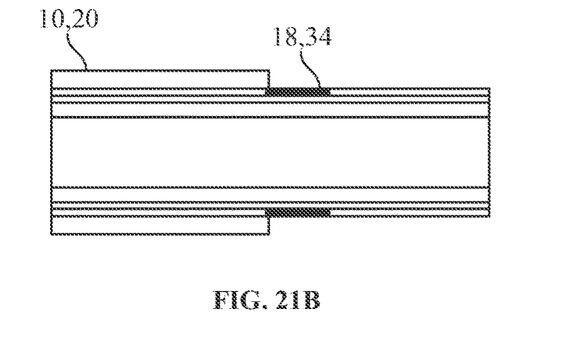

Systems and methods according to embodiments of the present disclosure may also be operative to initially remove the outer insulation 20 of a cable 10 entirely, or in a selective area, and subsequently apply heat with the induction coil 32 to affect the foil directly. This may include weakening of the foil, or vaporization thereof. FIGS. 21A and 21B illustrate the induction coil 32 arranged about the cable 10 in an area which has been pre-stripped of its outer insulation by, for example, the stripping blades 40. Once removed, a portion of the cable 10, such as the foil shield 18, may be heated in the designated or affected area 34 in the absence of the outer insulation therebetween. In one embodiment, induction heating is performed to melt a tin plating on select areas of the braid shield for fusing the braid strands together as the tin cools. Likewise, embodiments of the present disclosure are operative to perform a heat treatment process to anneal copper strands of the cable 10, making them easier to cut in a desired or predetermined location. These methods are beneficial for containment and cleanliness. More specifically, by fusing strands of the foil shield 18 in front of a designated cutoff area, a solidified area of waste material can be formed, enabling easier and more efficient processing, such as removal, handling and/or disposal.

Figure 22:
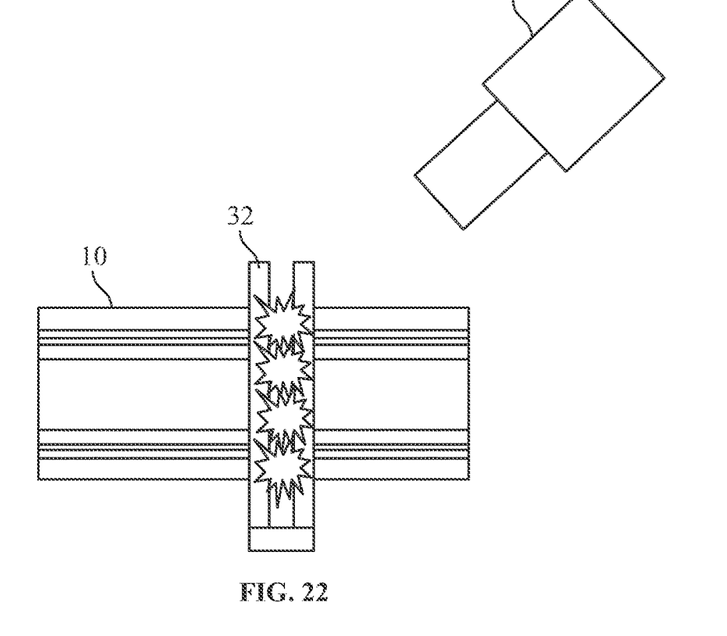
FIG. 22 is a diagrammatic view of the longitudinal cross-section of the illustrative cable with the induction coil extending around a circumference of the cable wherein a thermal imagining device is utilized for monitoring at least one characteristic of the cable during heating.

Referring now to FIG. 22, the thermal imaging device or IR camera 150 may be used for several process monitoring objectives. For example, the thermal imaging device 150 may be fixed within the system 70 and adapted to monitor the change in temperature in the cable 10 during the heating process, and alter the function of the induction coil 32 accordingly. In this way, the system 100 is enabled to automatically heat the cable 10 properly without needing inputs from the user. In addition to this closed-loop control of heating, the use of thermal detection devices improves quality control, ensuring proper temperature and/or time characteristics are achieved during a cable processing operation. The thermal imaging device 150 and the processor 110 may be configured to differentiate between cable sizes base on heating characteristics. Similar detection processes may be accomplished by the frequency and/or current monitors 130. Specifically, monitoring the frequency and/or current through the coil 32 can also be used to determine the size and/or type of the cable within the coil. This may be achieved by comparing measured values to predetermined values associating current and/or frequency with a characteristic of the cable. These predetermined values may be stored on the memory device 120. Frequency may also be monitored to determine the general presence or absence of a cable within the coil.

Figure 23A:
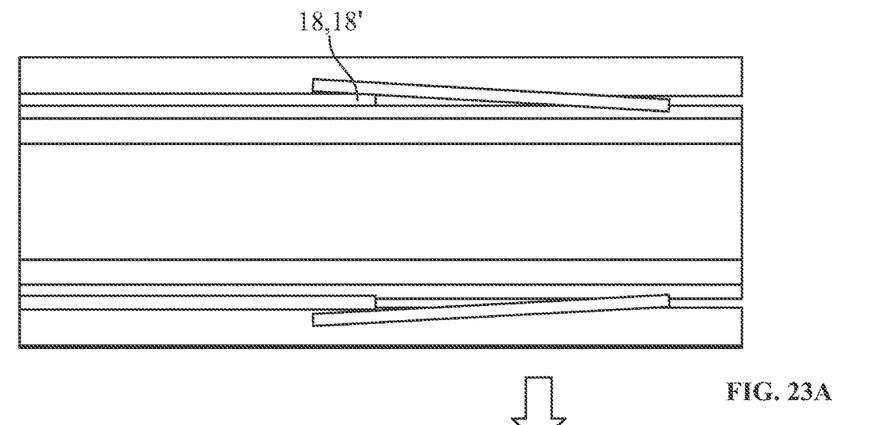
FIGS. 23A, 23B and 23C are diagrammatic views of the longitudinal cross-section of the illustrative cable in which the induction coil is positioned around overlapping portions of the foil shield of the cable.
Figure 23B:
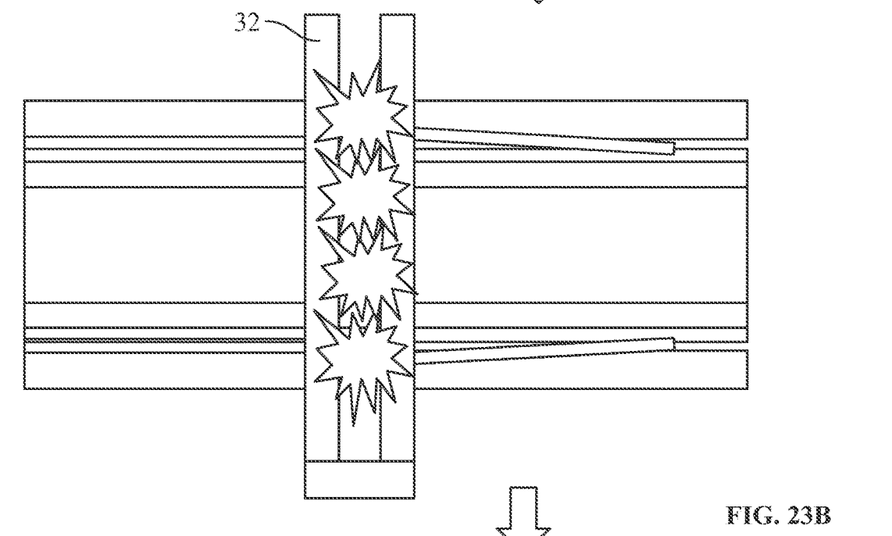
Figure 23C:
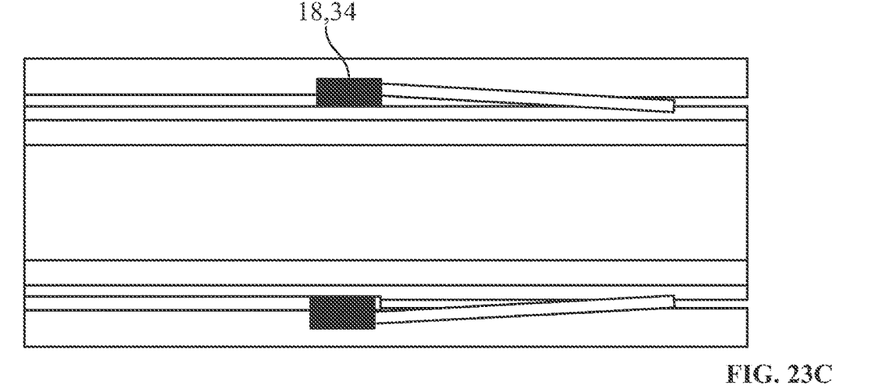

FIGS. 23A-23C illustrate the bonding of overlapped areas 18' of the foil shield 18 using inductive heating. Specifically, as shown in FIG. 23A, the foil shield 18 may comprise areas of overlap 18' over its length. These areas of overlap create difficulties in ensuring the entirety of the foil shield 18 is removed. By specifically targeting heating with the induction coil 32 in these problematic areas, as illustrated in FIGS. 23B and 23C, the foil shield 18 is ensured to be more completely removed in the resulting affected areas 34, improving process quality and efficiency.

Figure 24A:
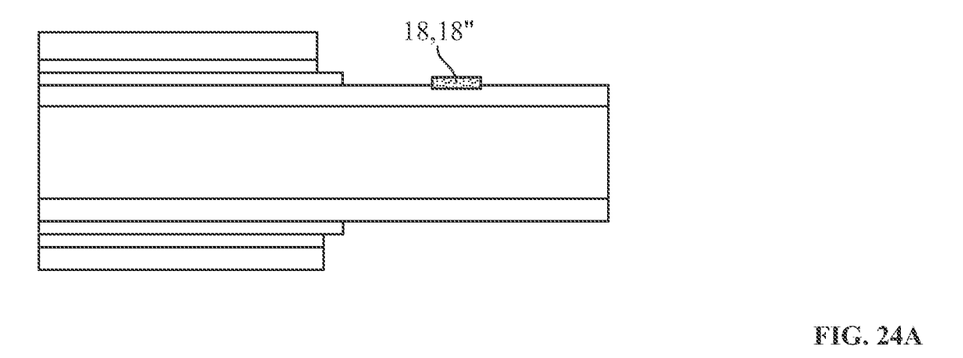
FIGS. 24A, 24B and 24C are diagrammatic views of the longitudinal cross-section of the illustrative cable in which the induction coil and the thermal imaging device are used to detect foil scrap or unwanted material on the cable.
Figure 24B:
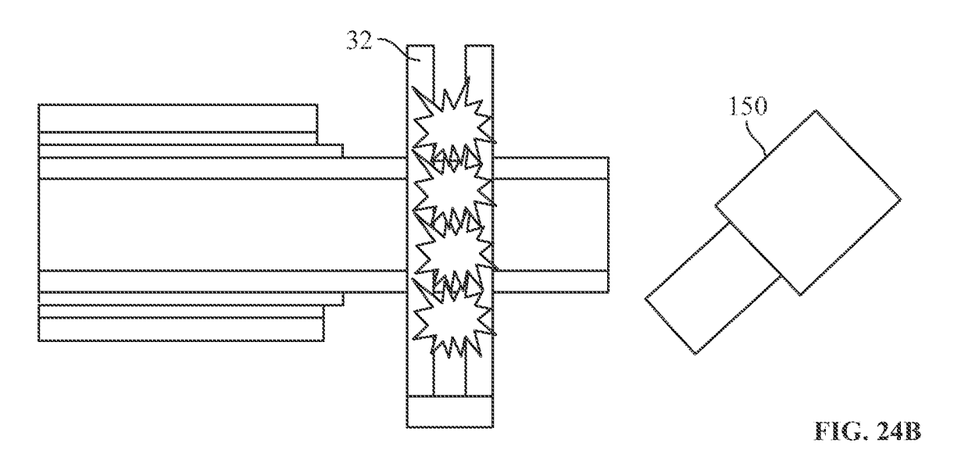
Figure 24C:
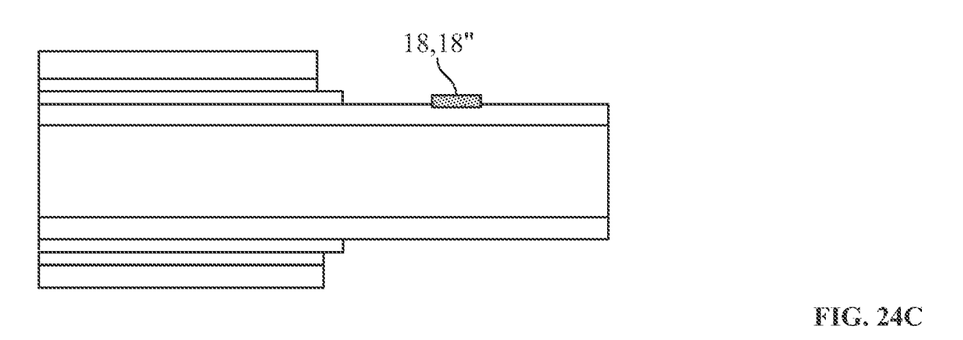

Referring now to FIGS. 24A-24C, embodiments of the present disclosure utilize inductive heating to make conductive scrap easier to detect. As illustrated, the inductive coil 32 may be used to generate a relatively small amount of heat sufficient enough to make the scrap visible to the thermal imaging device 150. If, for example, there is a piece of braid or foil scrap 18" remaining on the cable, the thermal imaging device 150 and/or the processor 110 may detect its heat signature and identify it as a potential issue, further improving process quality and control.

While the invention has been described with reference to a preferred embodiment, it will be understood by those skilled in the art that various changes may be made and equivalents may be substituted for elements thereof without departing from the spirit and scope of the invention as defined in the accompanying claims. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

What is claimed is:

1. A system for removing a foil shield from a cable, comprising:
    an induction coil for inductively heating the foil shield of the cable;
    a cable feeding device for selectively passing the cable through the induction coil;
    a cutting blade for selectively removing at least a portion of the cable;
    a sensor for detecting at least one characteristic of the cable; and
    a processor operative with a memory device and adapted to:
        measure a characteristic of at least one of the induction coil or the cable with the sensor; and
        in response to the measured characteristic, alter at least one of the operation of the induction coil, the relative position of the cable and the induction coil with the cable feeding device, or the operation of the cutting blade.

2. The system according to claim 1, wherein the processor is adapted to alter the operation of the induction coil in response to the measured characteristic.

3. The system according to claim 1, wherein the processor is adapted to alter the position of the cable with the cable feeding device in response to the measured characteristic.

4. The system according to claim 1, wherein the processor is adapted to alter the operation of the cutting blade in response to the measured characteristic.

5. The system according to claim 1, wherein the processor is adapted to operate the cutting blade to remove an outer insulation of the cable.

6. The system according to claim 5, wherein the processor is adapted to operate the cable feeding device to position the cable relative to the induction coil and heat the foil shield with the induction coil after the removal of the outer insulation of the cable.

7. The system according to claim 5, wherein the processor is adapted to operate the cutting blade to remove the outer insulation of the cable and remove the foil shield of the cable simultaneously.

8. The system according to claim 7, wherein the processor is adapted to operate the induction coil to adhere the foil shield to the outer insulation of the cable prior to removing the outer insulation and the foil shield with the cutting blade.

9. The system according to claim 1, wherein the sensor includes a current monitor, and the processor is further adapted to compare a measured current to a predetermined set of values associated with the physical characteristic of a cable.

10. The system according to claim 1, wherein the sensor includes a frequency monitor, and the processor is further adapted to compare an operating frequency to a predetermined set of values associated with a physical characteristic of a cable.

11. The system according to claim 1, wherein the sensor includes a thermal imaging device, and the processor is adapted to capture a thermal image of the cable.

12. The system according to claim 11, wherein the thermal image of the cable is captured after an outer insulation and the foil shield of the cable are removed by the cutting device, and the processor is adapted with the thermal imagining device to identify conductive scrap remaining on the cable.

13. The system according to claim 1, wherein the sensor includes a temperature sensor, and the processor is adapted to control at least one of the duration, current, or frequency of operation of the induction coil according to a measured temperature of the cable.

14. The system according to claim 1, wherein the processor is adapted to:
    operate the induction coil to heat the foil shield over a predetermined length; and
    after a predetermined cooling time to permit a plastic component of the foil shield to adhere to an outer insulation, operate the cutting blade to remove the foil shield and the outer insulation of the cable.

15. The system according to claim 1, wherein the processor is adapted to operate the induction coil to heat the foil shield in a periodic manner including a plurality of alternating heating and cooling cycles.

16. The system according to claim 1, wherein the processor is adapted to operate the cable feeding device to position overlapping areas of the foil shield within the induction heating source.

17. The system according to claim 1, wherein the induction coil comprises an opening for receiving and surrounding the cable.

18. A system for removing a foil shield from a cable, comprising:
    an induction coil adapted to inductively heat a cable;
    a cable feeding device adapted to selectively pass the cable through the induction coil, including:
    a first pair of rollers arranged on a first side of the induction coil; and
    a second pair of rollers arranged on a second side of the induction coil;
    a cutting blade assembly including at least two opposing cutting blades and adapted to selectively remove at least an outer insulation and a foil shield of the cable;
    a sensor for detecting at least one characteristic of the cable; and
    a processor operative with a memory device and adapted to:
    measure a characteristic of at least one of the induction coil or the cable with the sensor; and
    in response to the measured characteristic, alter at least one of the operation of the induction coil, the relative position of the cable and the induction coil with the cable feeding device, or the operation of the cutting blade assembly.

19. The system according to claim 18, wherein the induction coil comprises a circular opening adapted to surround the cable.

* * * * *